United States Patent [19]

Cormier

[11] 4,049,348
[45] Sept. 20, 1977

[54] PHOTOCOPYING APPARATUS

[76] Inventor: Yves Cormier, 17 rue Charles Morance, 72000 Le Mans, France

[21] Appl. No.: 642,604

[22] Filed: Dec. 19, 1975

[30] Foreign Application Priority Data

Dec. 23, 1974 France .............................. 74.42435

[51] Int. Cl.² ........................................... G03B 27/62
[52] U.S. Cl. ...................................................... 355/50
[58] Field of Search ...................... 355/48, 49, 50, 51, 355/75

[56] References Cited

U.S. PATENT DOCUMENTS

| 2,959,095 | 11/1960 | Magnusson | 355/49 |
| 3,503,678 | 3/1970 | Ludwig | 355/50 X |
| 3,558,224 | 1/1971 | Murgas et al. | 355/51 |
| 3,695,754 | 10/1972 | Washio et al. | 355/51 X |
| 3,806,239 | 4/1974 | Inoue et al. | 355/50 X |
| 3,858,975 | 1/1975 | Knechtel et al. | 355/50 |

Primary Examiner—Donald A. Griffin
Attorney, Agent, or Firm—Edwin E. Greigg

[57] ABSTRACT

In photocopying apparatus of the type in which the document to be copied is drawn to pass in front of an elongated exposure window extending transversely to the direction of passage, the window is constituted in a guide and support plate for the sheet to be copied. At least two long openings respectively on both sides of the window and parallel to the latter are each traversed by a front and rear roller respectively for driving the sheet, protruding a short height above the upper surface of the plate and extending in one or several sections, over substantially the whole width of the plate. The drive rollers cooperate by elastic pressure, with a "counterplate" arranged at a slight distance above the plate so as to constitute with it a flattened guide duct for the sheet to be copied, and presenting a smooth and slippery lower surface to the sheet. A finger protruding through a short longitudinal slot in the support plate against elastic pivoting means senses the passage of a sheet to be copied and actuates a microswitch to start the machine operations. The counterplate may be a thin transparent plate forming part of a removable guide and exposure carriage bearing a flexible cover sheet on one edge. This enables a page in a book to be copied.

8 Claims, 9 Drawing Figures

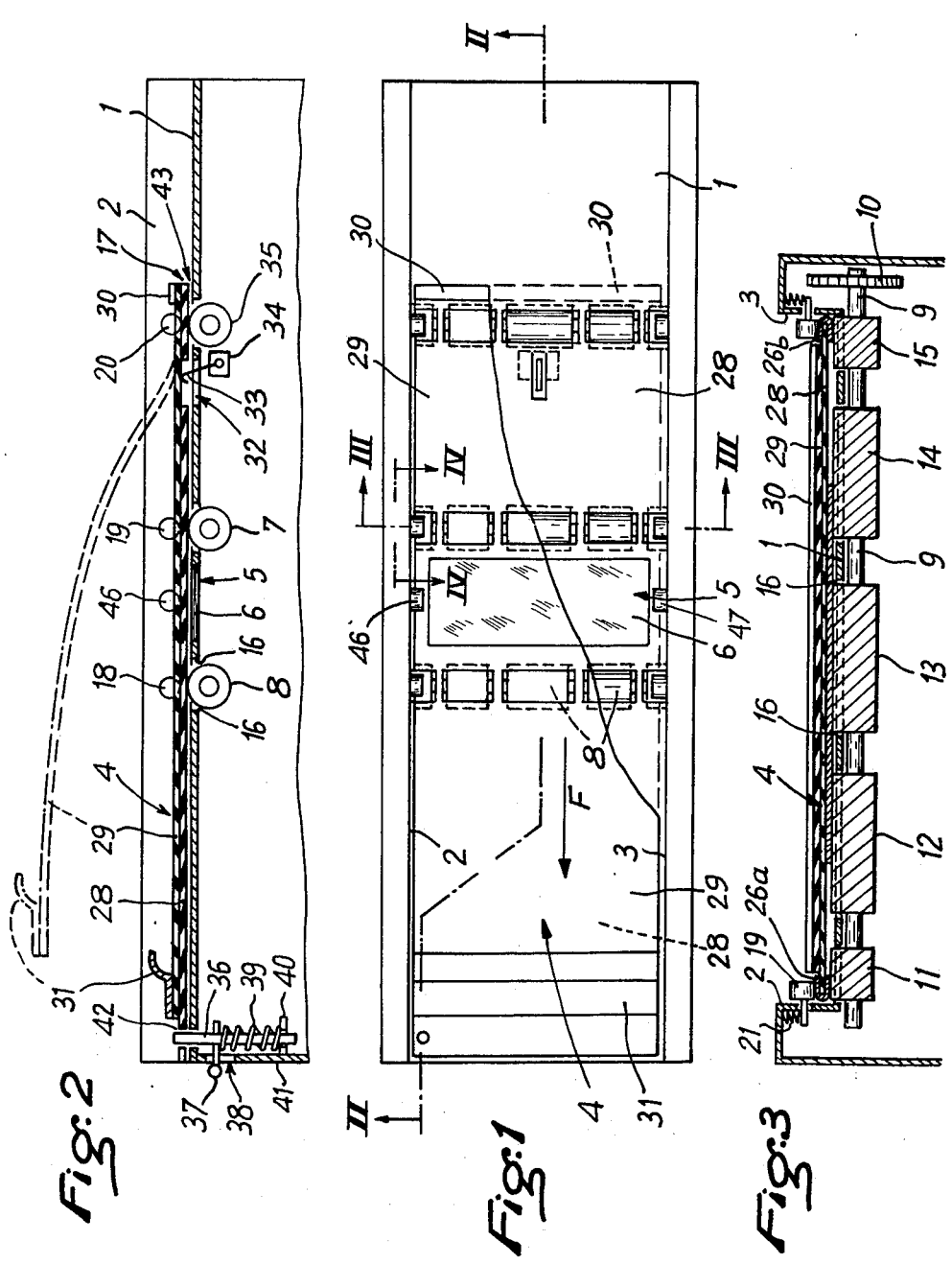

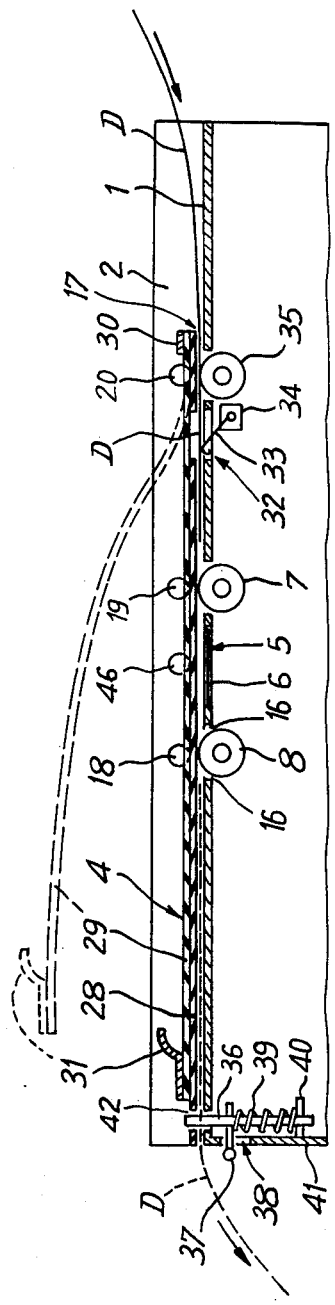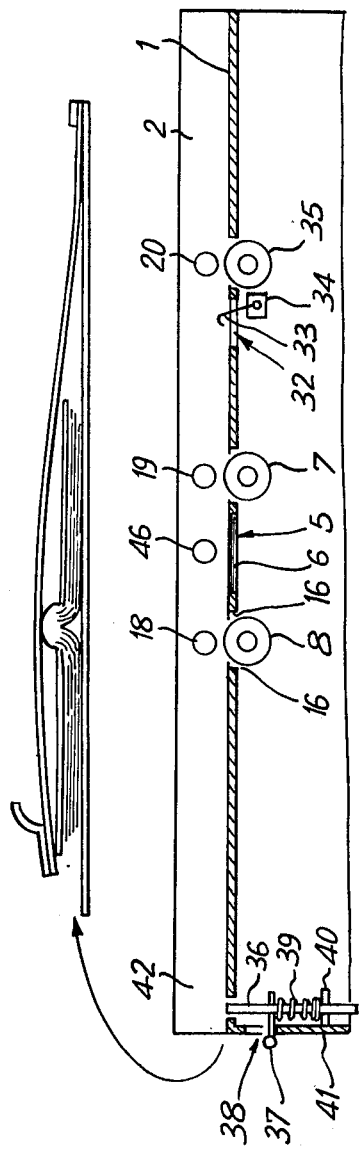

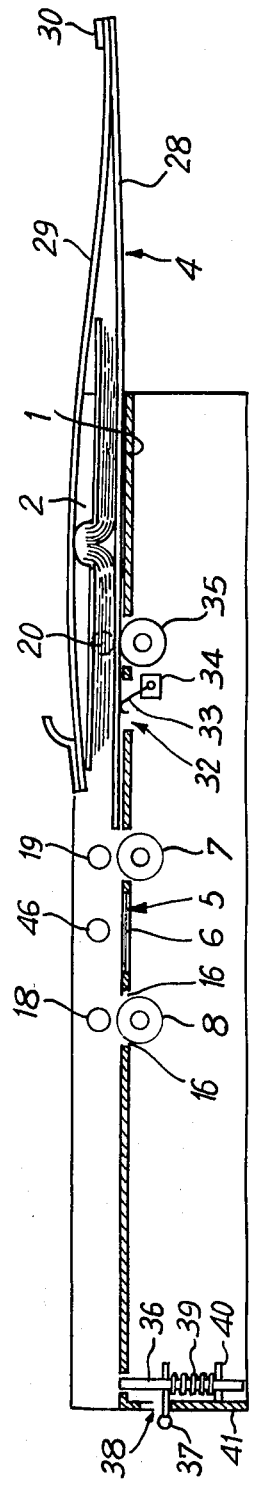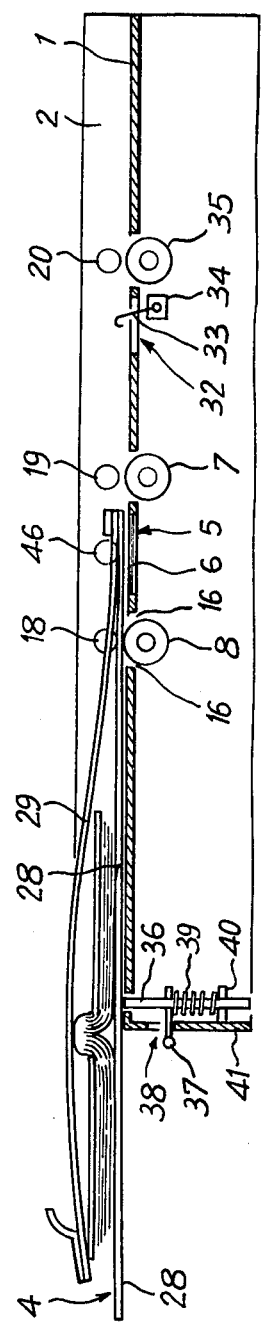

PHOTOCOPYING APPARATUS

BACKGROUND OF THE INVENTION

1. Field of the Invention

The invention relates to a photocopying apparatus of the slit-exposure type, that is to say in which the document to be copied is drawn in front of an elongated exposure window extending perpendicularly to the direction of passage while an optical system projects the image of the part of the document defined in the window, on to a sheet of sensitive paper which passes in the same or reverse direction correspondingly according to the optics of the system. It is drawn by a suitable mechanism into the device for developing the latent image and then discharged from the apparatus.

2. Description of the Prior Art

In known devices, the sheet constituting the document to be copied, generally arranged on a movable exposure carriage, is drawn to pass before the exposure window by a guide device comprising a certain number of pairs of rubber rollers. In each pair of rollers, the two rollers are on parallel axes and are adjacent, under slight pressure, so that, the sheet to be copied, introduced between the rollers of the same pair is thus conventionally gripped between the latter and drawn by their rotary movement. It is then taken up by the subsequent pair of rollers which rotate at the same speed, and so on. The exposure window is situated between two successive pairs of rollers and after complete exposure, is brought back to its starting point by reverse rotation of the rollers.

This device which necessitates recourse to a plurality of pairs of drive rollers and to a complex electrical and electronic control device, obviously requires much labor to manufacture. Moreover, it does not include the possibility of copying a page of a book or of a thick magazine.

OBJECTS AND SUMMARY OF THE INVENTION

It is an object of the invention to overcome the above-mentioned drawback and to provide a machine which is simpler and less expensive to manufacture.

It is a further object of the invention to provide a photocopying apparatus which enables a page of a book or thick magazine to be copied.

Accordingly the invention provides photocopying apparatus of simple construction, of the type in which the document to be copied is drawn to pass in front of an elongated exposure window extending transversely to the direction of passage, characterised in that the window is constituted in a guide plate designed to support the sheet to be copied, having at least two elongated suitable openings respectively on both sides of the window and parallel to the latter, each traversed by a drive roller for the sheet, front and rear respectively, emerging to a small height above the upper surface of the plate, extending in one or several sections over substantially the whole width of the plate, and cooperating, preferably with the interposition of elastic pressure means, with a counter-pressure plate or "counterplate", arranged at a slight distance above the plate so as to constitute with it a flattened guide duct for the sheet to be copied, and presenting a smooth and slippery lower surface to the sheet.

Thus, the driving of the sheet to be copied does not necessarily require the use of both a roller and an associated counter-roller to ensure that the passage of said sheet is exactly along the direction provided by the constructor and advances constantly parallel to itself. In fact, experience has shown that it suffices that the sheet should be, on one of its surfaces, subject to the action of one set of drive rollers, while its opposite surface is supported on a sufficiently smooth wall, here constituted by the lower surface of the exposure carriage.

According to another feature the photocopying apparatus according to the invention is also characterised in that the counterplate is constituted by a thin plate of transparent material forming an element of a removable guide and exposure carriage bearing preferably, on one of its edges, a flexible covering sheet, while arranged, on the one hand, in vertical line with the drive rollers, are pressure counter rollers or similar means, arranged on both sides of the apparatus so as to cooperate respectively with the corresponding longitudinal edges of the carriage and thus to apply the transparent plate to said rollers, on the other hand, on both sides of the plate, lateral guide means for the carriage, and lastly retractable means for locking the carriage above the exposure window and the drive rollers.

With such a device, to effect the copying of a page of a book, it suffices to place the locking device of the carriage in retracted position, to arrange the book on the upper surface of the exposure carriage after having removed the covering sheet and after having folded it back on the book, to engage the carriage between its lateral guide means, fast to the body of the apparatus on both sides of the plate, and then to slide it on to said plate until its lateral edges are gripped between the first drive roller and the corresponding pressure rollers; the carriage is then drawn by the pressure roller driving device, and which determines its engagement in the same way by the one or more following rollers and its passage at constant speed in front of the exposure window.

When the carriage, having reached the end of its travel, is no longer in contact with the rear roller, it stops advancing and it suffices, if it is desired to make a second copy of the same page of the book, to raise said carriage from the plate, to bring it back to the beginning of the latter and to repeat the operation as previously.

It must be noted that the lateral guide means of the carriage associated with the pressure rollers ensure its driving by the rollers under conditions responding fully to the above-formulated requirements.

On the other hand, when it is simply desired to copy a single sheet hanging from a thin file, it suffices to lock the carriage in the position shown in FIGS. 1 and 2 by placing the locking means in locking position. The carriage then behaves, through its plate of transparent material, like a simple counterthrust plate. The sheet to be copied is then pressed between this plate and the rollers of rubber or similar material whose rotation determines the driving of said sheet in translation in front of the exposure window as has been stated above.

BRIEF DESCRIPTION OF THE DRAWINGS

Other features of the invention will appear reading the description which follows of one embodiment of the invention, with reference to the accompanying drawings in which:

FIG. 1 is a plan view of one embodiment of a photocopying apparatus according to the invention, with the exposure carriage removed;

FIG. 2 is a section through the line II—II of FIG. 1, the upper part of the apparatus alone having been shown, with the exclusion of all the means of roller motion transmission, of the illuminating means and of the image developing means;

FIG. 3 is a section similar to that of FIG. 2 through the line III—III of FIG. 1;

FIGS. 6 to 9 are simplified views of the apparatus in different phases of its utilisation.

DESCRIPTION OF A PREFERRED EMBODIMENT

Figure 4:
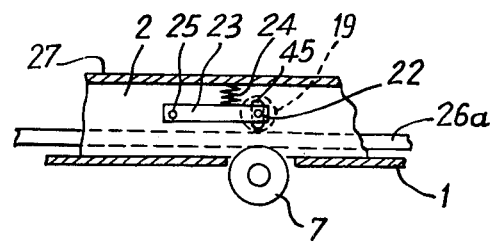
FIG. 4 is a detailed view of the assembly of the pressure rollers in section through the line IV—IV.

In the Figures, 1 denotes the support and guide plate of the photocopying apparatus, on both sides of which two vertical walls 2, 3 are constituted, forming lateral guide means for a guide and exposure carriage denoted as a whole by 4.

The apparatus comprises an elongated exposure window 5, formed in the plate and closed by a plate of glass 6 whose upper surface is coplanar with said plate.

Under the window 5 are arranged means for illuminating the document to be copied, as well as the objective lens, these elements being well known in the art and therefore not being shown in the drawings.

On both sides of the window 5 are arranged the drive rollers 7, 8, respectively "front" and "rear", of which the axles such as 9 (FIG. 3) bear a gear wheel, such as 10, on which a transmission chain (not shown) engages, through which a rotary motion in the same direction is applied to the rollers so as to draw the document to be copied in the direction of the arrow F.

The latter are formed, in the example, by five cylindrical sections such as 11 to 15 protuding a slight distance above the upper surface of the plate, through corresponding openings, such as 16, formed in the latter.

The third roller 35, called "engagement roller" constituted and rotated in the same manner as the two preceding ones, is arranged below the front end 17 of the carriage concerned in its locking position shown in FIGS. 1 and 2 and which will be explained below.

Vertically above the upper generator of each roller and at each end of the latter, is arranged a short pressure roller such as 18, 19, 20 positioned so as to grip the corresponding lateral edge of the carriage under the effect of elastic means 21 which have been simply shown diagrammatically in FIG. 3 and of which one embodiment is shown in detail in FIG. 4 where the roller 19 rotates on an axle 22 fast to a lever 23 pivotably mounted at 25 on a vertical wall 2 which has an elongated aperture 45 traversed vertically by the axle 22, while the horizontal fold 27 of said wall 2 acts as support element for the spiral spring 24 which acts by compression on the lever 23 so that the carriage 4 is applied against the drive rollers such as 7.

The carriage is constituted by a transparent plate 28 or "counterplate" preferably of plastics material, held in a rigidifying rectangular frame of thin metal 26 of which the four sides 26a, 26b, 26c and 26d are in the form of a channel and fastened two by two at their ends.

The very slight thickness of the longitudinal elements 26a, 26b, visible in section in FIG. 3 where their relative thickness has been much exaggerated, is not troublesome in practice by reason of the elasticity of the end elements of the rollers such as 11 and 15 with which they cooperate. Consequently, the essential condition of contact of the whole of the rollers with the counterplate of the carriage in the absence of the document to be copied is preserved.

However, it would also be possible, either to give the end elements of the roller a diameter slightly less than that of the other elements such as sections 12, 13, 14, or again to reduce the channel form elements of the frame to a simple L section of which the vertical arm does not exceed downwards the thickness of the counterplate.

The carriage has also a flexible cover sheet 29, preferably relatively heavy, designed to mask and protect the counterplate 28, when the apparatus is used in carriage locking position (FIGS. 1 and 2), to cover a book to be copied, arranged on said counterplate, as will be seen below. The flexible sheet 29 is held on the carriage 1 by a rigid bar 30 and it bears a manipulating element 31 on its opposite side.

The operating control for the various operations of the apparatus (with the exception of driving the rollers), is ensured by a microswitch 34 comprising an actuating finger 33 interposed in the path of the document to be copied, following the engagement roller 35 and, preferably, in the immediate vicinity of the latter.

If the actuating finger bore simply on the lower surface of the counterplate, its movement on the passage of a single sheet to be copied would correspond to the thickness of the latter and would hence be extremely slight. It would thus be insufficient to ensure the correct operation of the microswitch 34. This is the reason why, according to one feature of the invention, the counterplate has an elongated opening 32 designed to receive the end part of the actuating finger which, of course, is pivotably mounted around a horizontal axle parallel to the axles of the drive roller and is held directed through said longitudinal slot against the effect of a weak elastic return means (not shown) which urges it in the reverse direction to that of the advance of the sheet to be copied.

The device operates in the following manner:

When it is desired to copy a document presented in the form of a single sheet D, of paper for example, the chassis 4 is held slipped between the drive rollers and the pressure rollers and locked by the locking rod 36 which includes an operating element 37 passing through the front surface 41 of the apparatus through an elongated opening 38 and is urged upwards by a compression spring 39 which is supported on a guide plate 40 fast to said front surface. The carriage control or locking rod means 36 then traverses the opening 42 formed in one of the corners of the carriage and thus holds the latter in position in spite of the rotation of the drive rollers.

The sheet to be copied is then inserted in the insertion slot 43 constituting the inlet orifice of the flattened guide passage constituted between the plate 1 and the counter plate 28. It is then taken up by the engagement roller 35 which, constituted of rubber of the like, exerts on the lower surface of the sheet to be copied a distinctly greater adherance than that exerted at the same level on its upper surface of the lower, smooth and slippery surface, of the counterplate which is subjected to the pressure exerted on it by the roller 20. The sheet is thus drawn in translation parallel to itself if the longitudinal direction of the apparatus, that is to say, that of the arrow F perpendicularly to the axis of the drive rollers.

Immediately after having passed the engagement roller, the front edge of the sheet to be copied comes into contact with the actuating finger 33 which it pushes back under the effect of the engagement roller in the direction of the front roller 7. Under this thrust, the finger tilts until its end portion, in its descending movement, arrives at the level, little below that of the lower surface of the counterplate, at which it enables said front edge to pass by it and thus ensure free contact of the microswitch 34, by reason of the amplitude of the movement which has been imposed on it by this arrangement. Taking into account the relative rigidity of the documents presented for copying, considered over the narrow width of the opening 32 which constitutes the housing of its end portion, in resting position, the end portion of the finger is then held at this level during the whole duration of the passage of the sheet to be copied (FIG. 6), after which the finger returns backwards under the effect of its elastic return means. The action of the microswitch then ceases and it is possibly relayed by an electric or electronic device arranged in manner known in itself, so as to maintain the said operations of the apparatus in active position until the sheet to be copied has passed by the exposure window, the drive device then continuing its action at least until said sheet is freed from the rear roller and discharged from the apparatus, for example by gravity, (FIG. 6).

Of course, the devices, having the purpose of illuminating or developing the image, are not described in detail for the reason that they can be of any known type, adapted to obtain the required result.

When, with a photocopying apparatus according to the invention, it is desired to copy a page of a book or other relatively thick document which would not be suitable, by reason of this thickness for engagement according to the preceding method, between the lower surface of the counterplate and the drive rollers, it suffices to slide the locking rod 36 downwards, by operating element 37, against the elastic force of the spring 39 to a lower position where it is retained conventionally, for example by a suitable notch, formed on the elongated opening 38.

The carriage 4 can be released by sliding parallel to the plate 1, from the holding action of the drive rollers, cooperating with the pressure rollers (FIG. 7).

Figure 5:
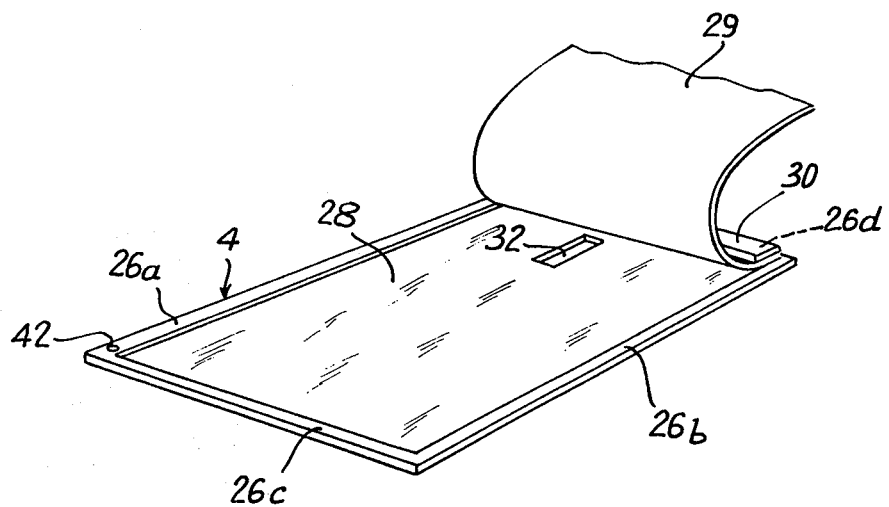
FIG. 5 is a perspective view of the movable exposure carriage.

Then, after having lifted the flexible cover sheet 29, substantially into the position of FIG. 5, it suffices to arrange the book, in open position on the counterplate of the thus freed carriage. The sheet 29 is relowered, in order essentially to avoid dazzling the operator in the course of the illumination operation as well as to hold the book firmly in exposure position on the counterplate. After this preliminary operation, the carriage is slid in the same direction as previously, until, supported on the plate and guided laterally by the guide walls 2, 3, between which it can slide with slight play, it is taken up between the engagement roller and its pressure rollers. Its front edge, constituted by the slide 26c, then causes, as did previously the front edge of the sheet to be copied, the tilting of the finger 35 and thus the bringing into action of the various operations of the apparatus (FIG. 8).

When, following its advance, the carriage reaches the front roller, it is inserted between the latter and its pressure roller, advances in front of the exposure window, then is inserted between the rear roller and the pressure roller which is associated with it, and lastly, the rotation of the rollers continuing, is freed from the rear roller, whence it can be taken up again to restore it to the initial engagement position in order to carry out, in the same way, a subsequent copying operation.

It is to be noted that, the transparent counterplate being thin, the focusing of the objective lens is not affected thereby and the image retains the same sharpness as in the previous case.

It is to be noted also that in order to preserve parallelism of the carriage with the plate as long as a part of the latter useful for the copy occurs vertically in line with the exposure window, two supplemental pressure rollers 46, 47 similar to the rollers previously described, but whose travel has been limited by a stop device (not shown), are arranged on both sides of the exposure window, so that the carriage remains horizontal even after having passed by its rear side, the level of the front roller (FIG. 9), which permits the focusing of the image to be preserved.

To restore the apparatus into the state for producing copies of separate sheets, it suffices to engage the carriage in the same way as has just been stated, between the drive rollers and the pressure rollers, to brake it with the hand at the moment when it arrives in the position shown in FIGS. 1 and 2, then to disengage the operating element 37 from its locking notch so that the rod 36 again passes through the opening 42 (FIG. 1).

The invention of which a particular embodiment has just been described, enables a photocopying apparatus to be constituted, which, while remaining very economical to manufacture, enables as necessary, the copying of, besides separate sheets, of pages of a document of considerable thickness, such as a bound book. This result is obtained with a remarkable economy of means, while known apparatuses, which enable similar peformances to be obtained, are always very complicated.

I claim:

1. Photocopying apparatus having an inlet end and an outlet end, said apparatus serving to duplicate open books and linearly traveling single sheets comprising a horizontally arranged guide plate, laterally spaced longitudinally extending guide means disposed adjacent to said guide plate, an exposure window associated with said guide plate, primary rotatable feed rollers spaced inwardly of said inlet end of said apparatus, secondary rotatable feed rollers in proximity to said exposure window, a linearly movable carriage element having oppositely disposed lateral edges, means associated with said longitudinally extending guide means adapted to engage said lateral edges of said carriage, carriage retention control means positioned in proximity to said outlet end of said apparatus, and microswitch means in proximity to said primary feed rollers serving to close a circuit to cause said primary and secondary rollers to begin rotation.

2. Photocopying apparatus as defined in claim 1, in which at least a portion of said carriage is supported in a rigidifying frame and further includes a flexible cover sheet.

3. Photocopying apparatus as defined in claim 2, in which said rigidifying frame encompasses a transparent counterplate provided with means defining an opening therein arranged for cooperation with said microswitch.

4. Photocopying apparatus as defined by claim 3, in which said counterplate is disposed in spaced relation to said guide plate to permit passage therebetween for copying of linearly traveling single sheets.

5. Photocopying apparatus as defined in claim 1, in which said means that engage said lateral edges of said carriage include pressure roller elements.

6. Photocopying apparatus as defined in claim 5, in which said pressure roller elements are mounted above and in opposition to said primary and secondary feed rollers.

7. Photocopying apparatus as defined in claim 5, in which further oppositely disposed supplemental pressure rollers are arranged substantially medially of said pressure roller elements.

8. Photocopying apparatus as defined in claim 1, in which secondary feed rollers include a transversely extending array of independent elements of varying diameter.